Nov. 24, 1964    F. SHANDEL    3,158,050
ROTATABLE IMPACT WRENCHES AND THE LIKE
Filed March 4, 1963
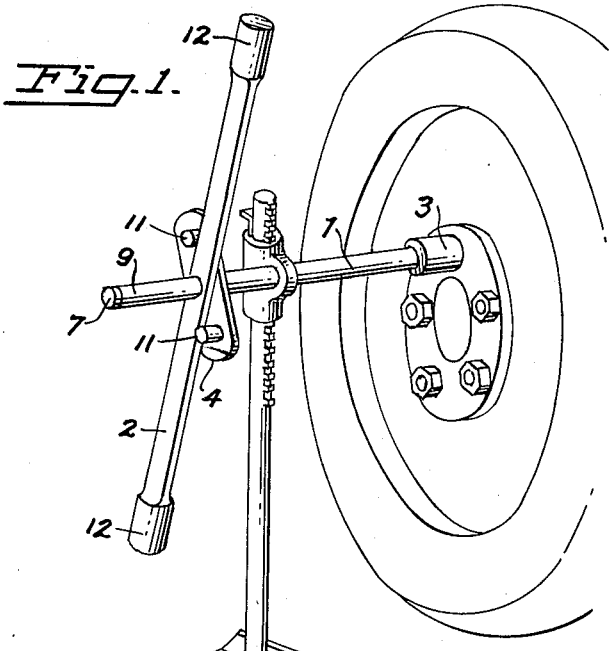
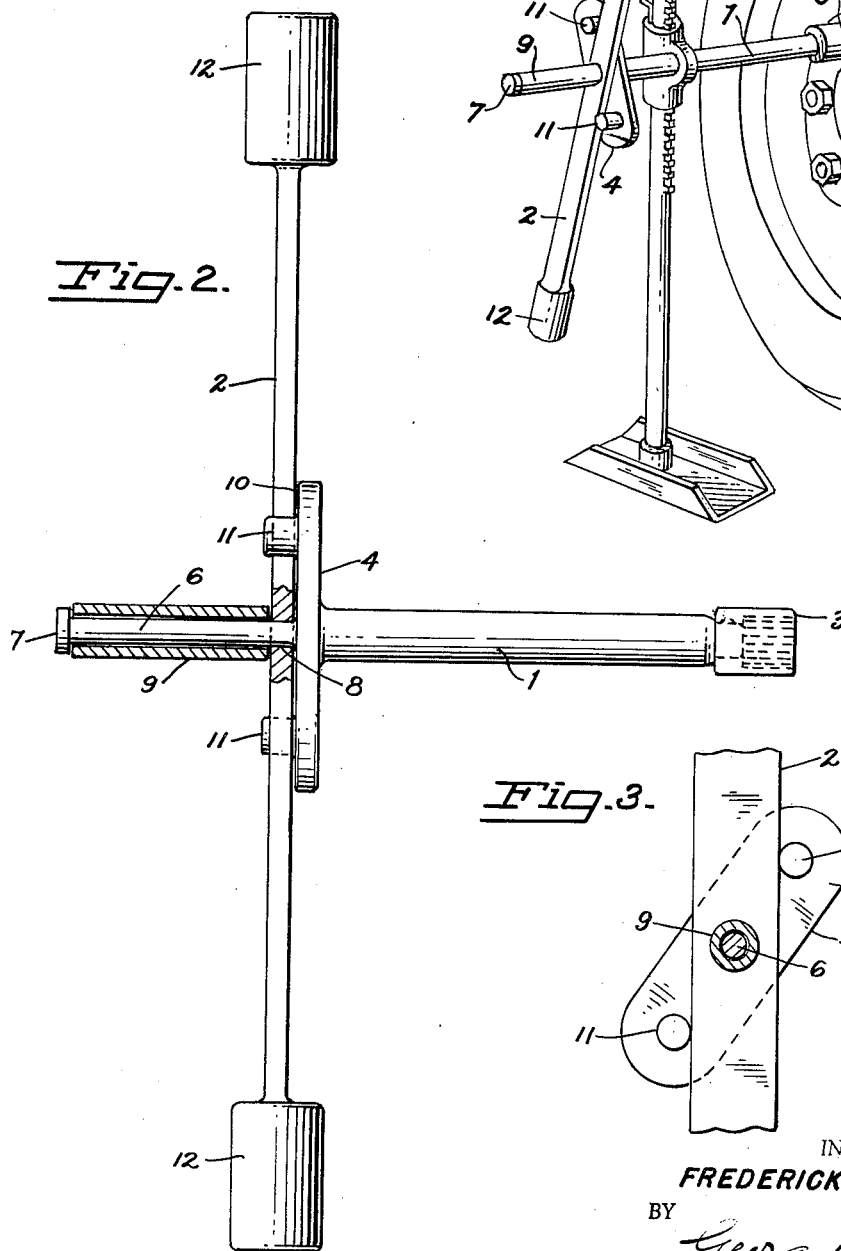
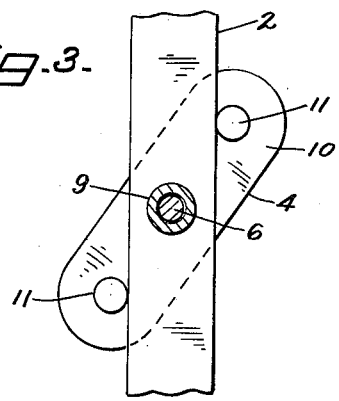
INVENTOR.
FREDERICK SHANDEL
BY
*George B. White*
ATTORNEY

United States Patent Office 3,158,050
Patented Nov. 24, 1964

3,158,050
ROTATABLE IMPACT WRENCHES AND THE LIKE
Frederick Shandel, Albion, Calif.
Filed Mar. 4, 1963, Ser. No. 262,500
4 Claims. (Cl. 81—52.3)

This invention relates to rotatable impact wrenches and the like.

The primary object of the invention is to provide a manually operated tool wherein the inertia of weights on a rotatable cross arm is efficiently utilized to loosen or tighten screw threaded parts, such as nuts or bolts; and wherein the blow struck by a weighted arm is positively directed and is converted into turning moment of a spindle adapted to turn the nut or bolt.

I am aware that some changes may be made in the general arrangement and combination of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a perspective view of my impact wrench on a journal support in operation on a wheel.

FIG. 2 is a partly sectional view of my impact wrench, and

FIG. 3 is a fragmental end view showing the handle in section.

The illustrative embodiment of this invention generally includes a spindle 1, a weighted cross-arm 2 and connecting means between the spindle and the cross-arm to permit limited rotation of the cross-arm 2 so as to create an impact or blow and to convert such blow into turning force on the spindle 1.

The spindle 1 has a suitable socket 3 on an end thereof fitting over a nut or bolt, and into which other suitable turning tools may be fitted in the usual manner.

A transverse, generally diametrical flange 4 is fixedly formed on the spindle 1 spaced from the socket 3. A reduced spindle portion 6 extends from the center of the flange 4 in axial registry with the body of the spindle 1. A head 7 is formed on the outer end of the reduced spindle portion 6.

The cross-arm 2 is generally flat, at least at the portion overlying the flange 4. The flat cross-arm 2 has a journal aperture 8 journalled on the reduced spindle portion 6 immediately adjacent the flange 4. A spacer sleeve 9 on the reduced spindle portion 6 between the head 7 and the cross-arm 2 holds the cross-arm 2 against the adjacent face 10 of the flange 4.

A pair of abutment lugs 11 extend from the face 10 of the flange 4 generally parallel with the axis of the spindle 1. The lugs 11 are spaced equidistant and diametrically opposite with respect to the axis of the spindle 1.

The cross-arm 2 extends in both directions considerably beyond the rim of the flange 4 and beyond said lugs 11. A suitable weight 12 is fixed on each end of the cross-arm 2 so as to generate inertia forces when the cross-arm 2 is rotated between the lugs 11 in either direction.

In operation the spindle 1 is supported in a suitable manner, for instance as described in my co-pending application for Device for Removing Wheel Nuts and Bolts, Serial No. 857,766, filed December 7, 1959, now U.S. Patent No. 3,069,945. The socket or tool is engaged with the nut or bolt. The operator grasps the rotatable sleeve 9 as a handle with one hand and for loosening a right handed screw threaded part spins the cross-arm 2 with the other hand contraclockwise viewing FIG. 1 so as to impart a blow on the lugs 11 in the desired direction. Then the cross-arm 2 is returned to its initial position and spun again, repeatedly until the nut or bolt is loosened. Thereafter by continuing the rotation of the cross-arm 2 the nut or bolt can be unscrewed. For tightening a right handed nut or bolt the cross-arm 2 is rotated in clockwise direction viewing FIG. 1 until the nut or bolt is tightened and then it is repeatedly released and spun against the lugs 11 for impact tightening of the nut or bolt.

The device is very simple in construction and operation. It has minimum moving parts, and imparts firm blows for impact loosening or tightening of nuts and bolts efficiently and with great facility.

I claim:

1. An impact wrench comprising
   (a) a spindle,
   (b) means on an end of said spindle for engaging the object to be turned,
   (c) a flange extending radially outwardly of said spindle
   (d) a pair of abutments extended from said flange spaced in opposite directions from said spindle and projecting generally parallel with the axis of said spindle
   (e) a cross-arm journalled on said spindle being freely rotatable about the axis of said spindle
   (f) weights on the opposite end portions of said cross-arm
   (g) said cross-arm abutting against said abutments so as to impart an impact for rotating said spindle,
   (h) a handle extension on said spindle extended beyond said flange and beyond said cross arm,
   (i) and a rotatable handle sleeve on said handle extension.

2. An impact wrench comprising
   (a) a spindle
   (b) a turning tool on one end of the spindle
   (c) a flange extending outwardly from the spindle
   (d) diametrically opposite abutment elements projecting from a face of said flange spaced generally equidistant from the axis of the spindle
   (e) a cross-arm journalled diametrically on said spindle so as to be freely rotatable about the axis of the spindle
   (f) weights on the opposite end portions of the cross-arm for imparting acceleration to said cross-arm,
   (g) a flat portion of said cross-arm moving along the adjacent face of said flange and between said abutment elements so as to impart a blow to said abutment elements for rotating said spindle and turning tool,
   (h) and handle means axially extended from said flange beyond said flat portion, said spindle being rotatable relatively to said handle means.

3. An impact wrench comprising
   (a) a spindle
   (b) a turning tool socket in one end of the spindle
   (c) a substantially diametrical flange extending outwardly from the spindle
   (d) abutment projections on a face of said flange spaced substantially equidistant and diametrically opposite from the axis of the spindle
   (e) a reduced spindle portion extended from said flange
   (f) a flat cross-arm journalled on the reduced spindle portion adjacent said face of said flange and between said abutment projections (g) weights on the outer portions of said cross-arm to accelerate rotation of said cross-arm (h) the width of said cross-arm being such as to permit limited rotation of the cross-arm between said projections, the opposite edges of said cross-arm contacting said pins after each limited rotation so as to impart a blow to said projections for turning said flange, said spindle and said tool socket, (i) and handle means axially extended from said flange beyond said flat portion, said spindle being rotatable relatively to said handle means.

4. An impact wrench comprising
(a) a spindle
(b) means on an end of said spindle for engaging the object to be turned
(c) a flange extending radially outwardly of said spindle
(d) a pair of abutments extended from said flange spaced in opposite directions from said spindle and projecting generally parallel with the axis of said spindle
(e) a cross-arm journalled on said spindle being freely rotatable about the axis of said spindle
(f) weights on the opposite end portions of said cross-arm
(g) said cross-arm abutting against said abutments so as to impart an impact for rotating said spindle,
(h) a reduced spindle portion extended axially from said flange
(i) a head on said reduced spindle portion spaced from said flange
(j) and a spacer sleeve rotatable on said reduced portion between said cross-arm and said head to form a handle for holding said wrench.

References Cited in the file of this patent

UNITED STATES PATENTS

| | | |
|---|---|---|
| 2,279,118 | Fortune et al. | Apr. 7, 1942 |
| 2,793,551 | Ford | May 28, 1957 |
| 3,069,945 | Shandel | Dec. 25, 1962 |

FOREIGN PATENTS

| | | |
|---|---|---|
| 741,378 | Germany | Nov. 10, 1943 |
| 280,510 | Great Britain | Jan. 12, 1927 |
| 511,547 | Great Britain | Aug. 21, 1939 |